United States Patent
Huang et al.

(10) Patent No.: US 12,294,309 B2
(45) Date of Patent: May 6, 2025

(54) TRANFORMER BASED VOLTAGE REGULATOR WITH FLEXIBLE TRANS-INDUCTOR STRUCTURE

(71) Applicant: Analog Devices, Inc., Wilmington, MA (US)

(72) Inventors: Xingxuan Huang, San Jose, CA (US); Chuan Shi, San Jose, CA (US); Xinyu Liang, San Jose, CA (US); Jonathan Paolucci, Santa Clara, CA (US)

(73) Assignee: Analog Devices, Inc., Wilmington, MA (US)

( * ) Notice: Subject to any disclaimer, the term of this patent is extended or adjusted under 35 U.S.C. 154(b) by 295 days.

(21) Appl. No.: 17/930,996

(22) Filed: Sep. 9, 2022

(65) Prior Publication Data

US 2024/0088795 A1 Mar. 14, 2024

(51) Int. Cl.
*H02M 3/335* (2006.01)
*H02M 1/14* (2006.01)

(52) U.S. Cl.
CPC ......... *H02M 3/33576* (2013.01); *H02M 1/14* (2013.01); *H02M 3/33573* (2021.05)

(58) Field of Classification Search
CPC .......... H02M 1/14; H02M 1/143; H02M 1/15; H02M 3/335; H02M 3/33507; H02M 3/33569; H02M 3/33573; H02M 3/33576; H02M 3/33592

See application file for complete search history.

(56) References Cited

U.S. PATENT DOCUMENTS

| | | | | |
|---|---|---|---|---|
| RE36,040 E | * | 1/1999 | Ou | H02M 3/33523 363/133 |
| 6,388,898 B1 | * | 5/2002 | Fan | H02M 3/33561 363/20 |
| 7,791,321 B2 | | 9/2010 | Xu et al. | |
| 8,068,355 B1 | * | 11/2011 | Ikriannikov | H02M 3/285 363/16 |
| 11,195,655 B2 | | 12/2021 | Paolucci | |
| 2012/0327633 A1 | | 12/2012 | Jang | |
| 2021/0327634 A1 | * | 10/2021 | Liang | H01F 29/025 |

OTHER PUBLICATIONS

"DAC8800 Data Sheet", Analog Devices, Inc., (Mar. 12, 1996), 16 pgs.

(Continued)

*Primary Examiner* — Gary L Laxton
(74) *Attorney, Agent, or Firm* — Schwegman Lundberg & Woessner, P.A.

(57) ABSTRACT

A multi-phase regulator circuit includes one or more switching converter circuits. Each switching converter circuit includes a transformer including a primary winding and a multi-segment secondary winding, a primary side switch circuit configured to connect the primary winding to an input of the multi-phase regulator circuit, and multiple secondary side circuits including multiple coupled-inductor circuits. Each coupled-inductor circuit includes a first winding magnetically coupled to a second winding. Each segment of the transformer multi-segment secondary winding is operatively coupled to the first winding of a coupled-inductor circuit and each of the first windings is connected to an output of the multi-phase regulator circuit.

18 Claims, 21 Drawing Sheets

(56) References Cited

OTHER PUBLICATIONS

"Fast multi-phase trans-inductor voltage regulator", Technical Disclosure Commons, https://www.tdcommons.org/dpubs_series/2194, (May 9, 2019), 15 pgs.
Xu, Ming, et al., "Novel Coupled-Inductor Multi-phase VRs", 22nd Annual IEEE Applied Power Electronics Conference and Exposition (APEC), (2007), 113-119.

* cited by examiner

TRANFORMER BASED VOLTAGE REGULATOR WITH FLEXIBLE TRANS-INDUCTOR STRUCTURE

BACKGROUND

Electronic systems can include devices that require a regulated power source. Power circuits can be used to provide a circuit supply rail having a regulated voltage. Some power circuits include a switching converter circuit that uses switching to energize and de-energize a magnetic circuit element (e.g., an inductor) to provide a regulated voltage at the output.

Electronic systems can include one or more microprocessors. As manufacturers continue to develop microprocessors that are more and more complex, microprocessors require higher and higher current with increasingly high slew rate. The regulator circuits for these electronic systems should have a fast dynamic response during a load transient. The alternative would be a large output capacitance to limit ripple in the regulated output voltage, but a large output capacitor adds size and cost to the regulator circuits. In addition, high efficiency voltage regulators are desired for microprocessor systems to reduce energy cost.

SUMMARY OF THE DISCLOSURE

This document relates generally to regulator circuits and methods of their operation. An example of a multi-phase regulator circuit includes one or more switching converter circuits. Each switching converter circuit includes a transformer (e.g., a planar transformer) including a primary winding and a multi-segment secondary winding, a primary side switch circuit configured to connect the primary winding to an input of the multi-phase regulator circuit, and multiple coupled-inductor circuits connected to the multi-segment secondary winding of the transformer. Each coupled-inductor circuit including a first winding magnetically coupled to a second winding. Each segment of the multi-segment secondary winding is connected to the first winding of a coupled-inductor circuit and each of the first windings is connected to an output of the multi-phase regulator circuit.

An example of a method of operating multi-phase regulator circuit includes applying an input voltage to a primary winding of a transformer of a switching converter circuit of the multi-phase regulator circuit, extracting energy from multiple segments of a secondary winding of the transformer, and charging multiple coupled-inductor circuits using the extracted energy. A coupled-inductor circuit includes a first winding magnetically coupled to a second winding, and the second winding of the coupled-inductor circuit is connected to a second winding of another coupled-inductor circuit. The method further includes applying output current to an output node via the coupled-inductor circuits.

An example of a multi-phase regulator circuit includes multiple switching converter circuits and a controller circuit connected to the multiple switching converter circuits. Each switching converter circuit is connected to an input and a common output node of the multi-phase regulator circuit. Each switching converter circuit includes a step-down transformer including a primary winding and multiple secondary windings, a primary side circuit stage connected to the input and the primary winding of the step-down transformer and including at least one primary side switch, and a secondary side circuit stage connected to the multiple secondary windings of the step-down transformer, and including at least one secondary side switch and one or more coupled-inductor circuits connected to the common output node. The controller circuit is configured to generate multiple activation signals to activate the primary side switch of a switching converter circuit out of phase with the at least one primary side switch of another switching converter circuit, and generate multiple activation signals to the secondary side switch circuits to provide electrical energy to the coupled-inductor circuits.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Power circuits may need to provide a fixed or stable output voltage as an electrical circuit supply for an electronic system. Some power circuits are switching converter circuits that convert the input voltage to a regulated output voltage. The regulation is typically achieved by recurrently charging a magnetic circuit element, such as an inductor, from an energy source and then discharging the energy of the magnetic circuit element to drive a load. The charging and discharging can be accomplished using electronic switches that include transistors.

The voltage regulators (VRs) for electronic systems with complex microprocessors need to have a fast dynamic response during a load transient and need to be efficient to reduce energy cost. Multi-phase VRs have a fast dynamic response, and these VRs can be used to power a wide range of microprocessors, such as Central Processing Units (CPUs), Graphics Processing Units (GPUs), and Application Specific Integrated Circuits (ASICs). In recent years, these types of microprocessors have come to require higher and higher current with higher slew rate. Hence, VRs need to have faster and faster dynamic response during load transients to satisfy the output voltage ripple requirements of the electronic systems. From the point of view of cost, it is important to achieve faster dynamic performance because it can effectively reduce the required output capacitance and therefore reduce the system cost.

Multi-phase voltage regulators VRs can include multiple switching converters connected in parallel. Each of the parallel connected switching converters can be operated with a different phase with respect to each other for energizing and de-energizing the inductors so that the current requirement of the VR is divided among the inductors.

Figure 1:
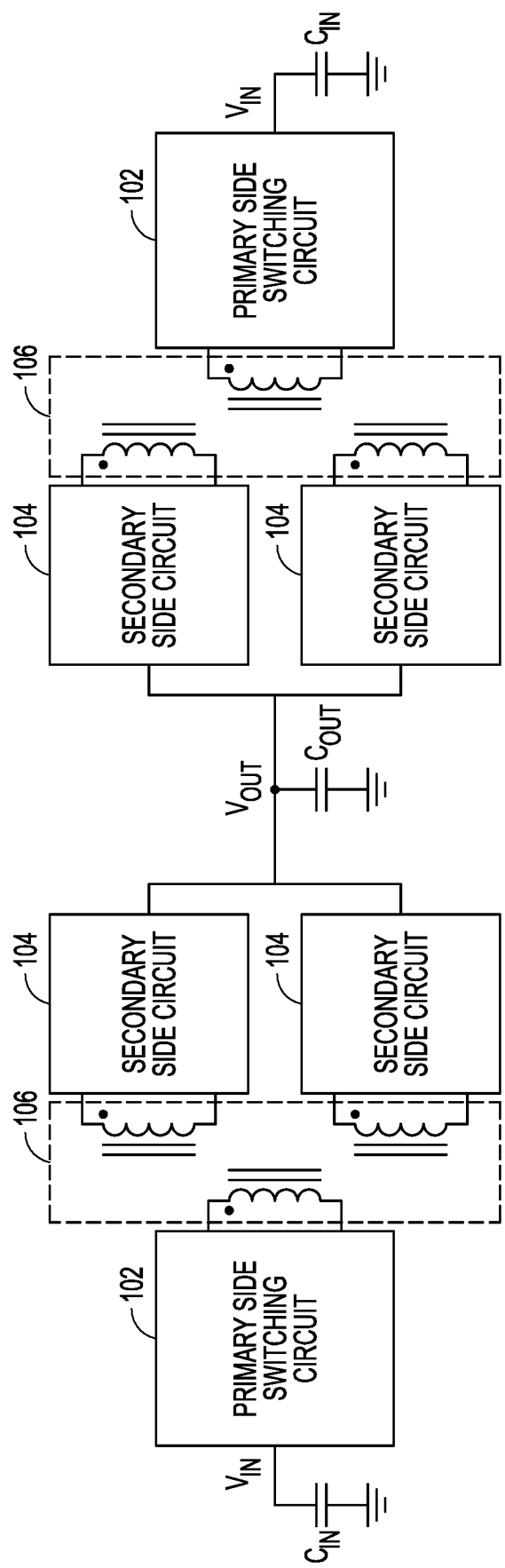
FIG. 1 is a block diagram of an example of a multi-phase transformer-based voltage regulator.

FIG. 1 is a generalized block diagram of an example of a multi-phase transformer-based VR. Transformer-based VRs include a primary side switching circuit 102 and a secondary side circuit 104 electrically isolated from the primary side by an isolation transformer 106. The example in FIG. 1 includes two circuit modules. Each circuit module includes a primary side switching circuit 102 and two secondary side circuits 104 for a two-phase VR. For a DC-DC converter, a DC voltage $V_{IN}$ is input to the primary side switching circuit 102. High frequency switching by the primary side switching circuit 102 produces high frequency AC across the isolation transformer. The output of the isolation transformer 106 is rectified and filtered to produce a DC output voltage $V_{OUT}$.

Figure 2:
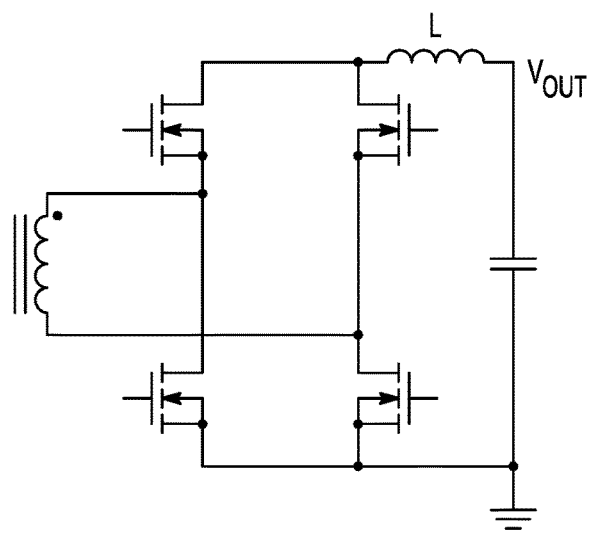
FIG. 2 is a circuit schematic of a full-bridge rectifier useable in the multi-phase transformer-based voltage regulator of FIG. 1.
Figure 3:
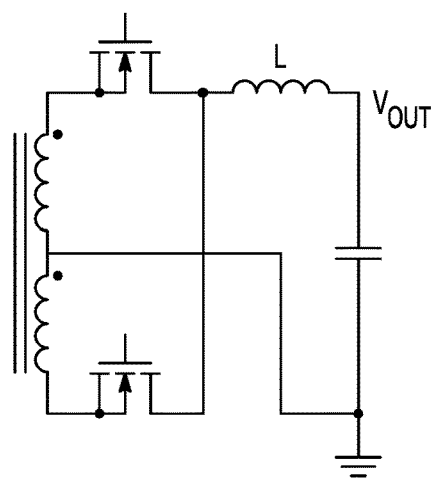
FIG. 3 is a circuit schematic of a half-bridge rectifier useable in the multi-phase transformer-based voltage regulator of FIG. 1.
Figure 4:
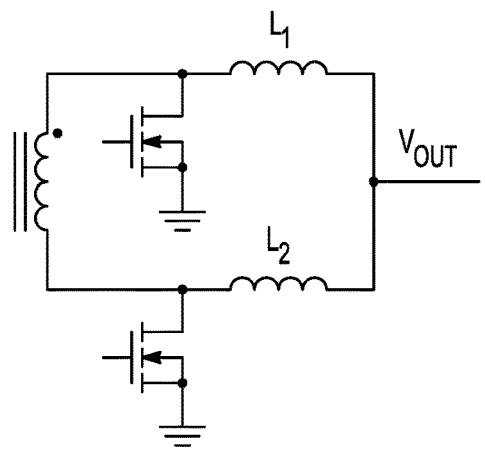
FIG. 4 is a circuit schematic of a current doubler useable in the multi-phase transformer-based voltage regulator of FIG. 1.

Some examples of the primary side switching circuit 102 include a full-bridge switching circuit for an isolated full-bridge converter, or a half-bridge switching circuit for an isolated half-bridge converter. FIGS. 2-4 show some examples of circuits useable for the secondary side circuits 104 in FIG. 1, including a full-bridge rectifier circuit in FIG. 2, half-bridge rectifier circuit with center-tapped transformer in FIG. 3, and a current doubler circuit in FIG. 4.

Figure 16:
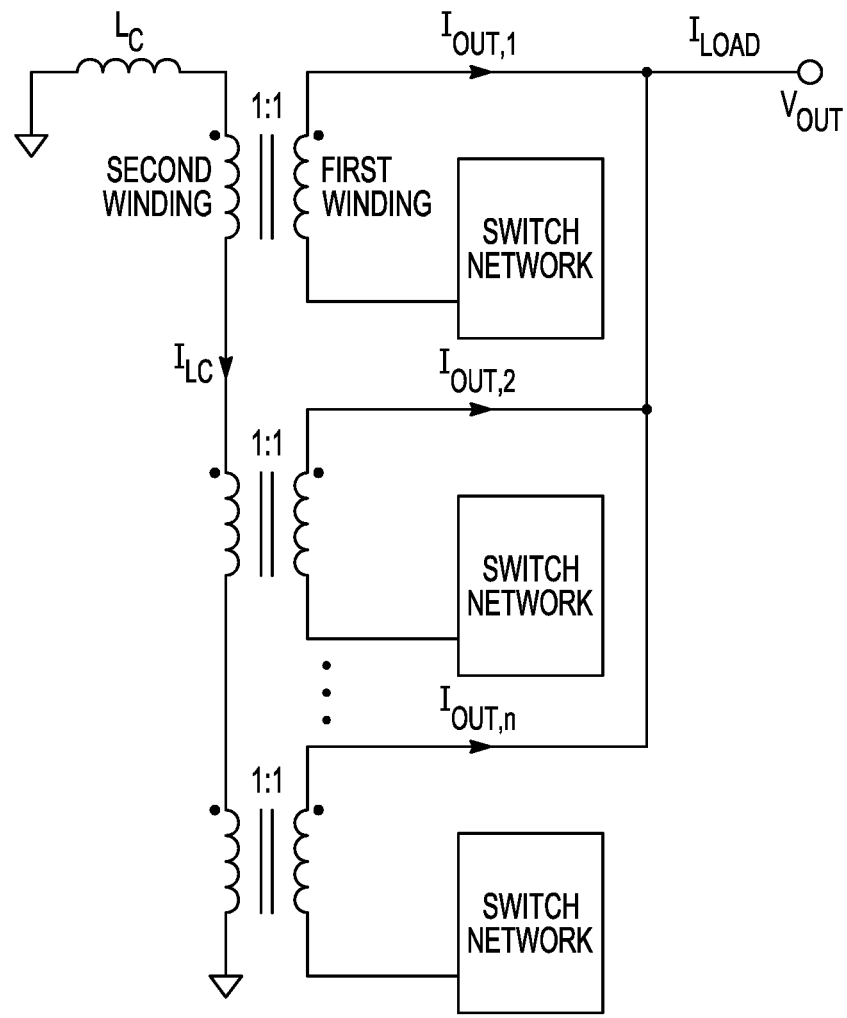
FIG. 16 is a schematic of a multi-phase trans-inductor voltage regulator.

FIG. 16 is a schematic of an n-phase trans-inductor voltage regulator (TLVR). Each of the n-phases has an output inductor that is the first winding of a coupled inductor. The second windings of the coupled inductors are all connected in a series loop. A TLVR structure can be used to increase the dynamic response of the VR during load transients. Because of the coupling effect of the windings, the output current of all n-phases can ramp up or down at the same time once the duty cycle of one phase of the VR changes to respond to a load transient. An additional compensation inductor $L_c$ is connected in series to the second windings that can limit the current ripple in the second windings.

Figure 5:
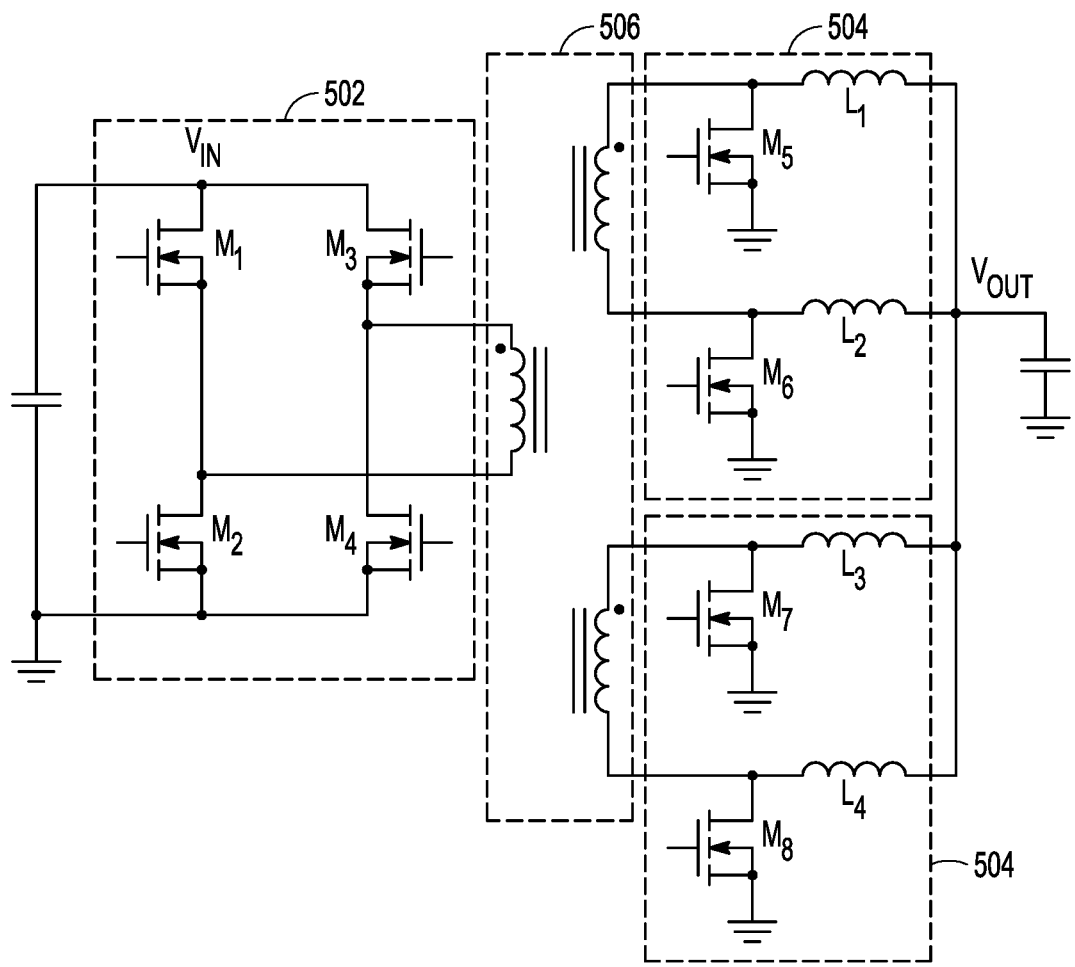
FIG. 5 is a circuit schematic of an example of a multi-phase transformer-based voltage regulator circuit.

FIG. 5 is an example of a multi-phase transformer-based VR circuit. The regulator circuit includes a primary side switching circuit 502 that is a full-bridge switching circuit and two secondary side circuits 504 that have a current doubler circuit topology. The isolation transformer 506 can be a step-down transformer. The isolation transformer 506 includes a primary winding and a multi-segment secondary winding. In the example of FIG. 5, the secondary winding is a two-segment secondary winding. The secondary side circuits 504 each include two output inductors (L1-L2 and L3-L4) that are connected together and to the output $V_{OUT}$.

Figure 6:
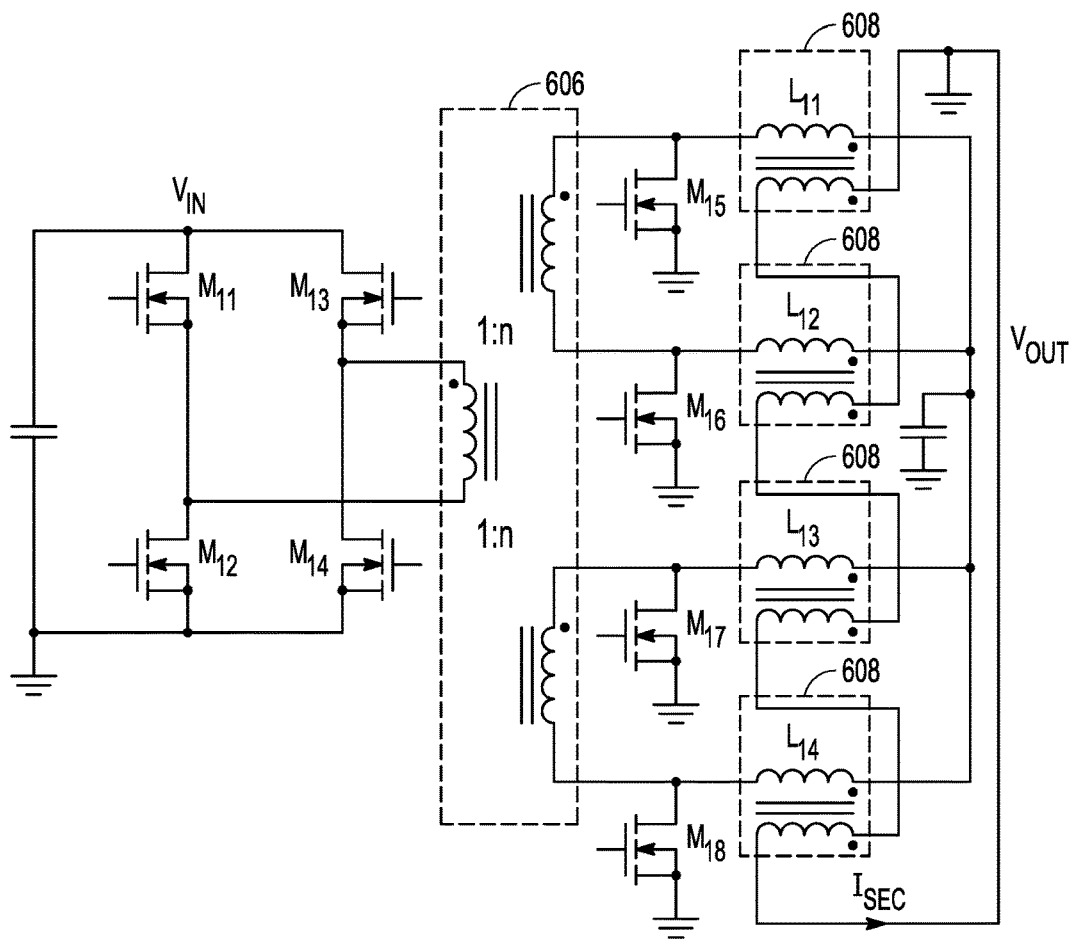
FIG. 6 is an example of a multi-phase transformer-based voltage regulator circuit with trans-inductor voltage regulator structures.
Figure 7:
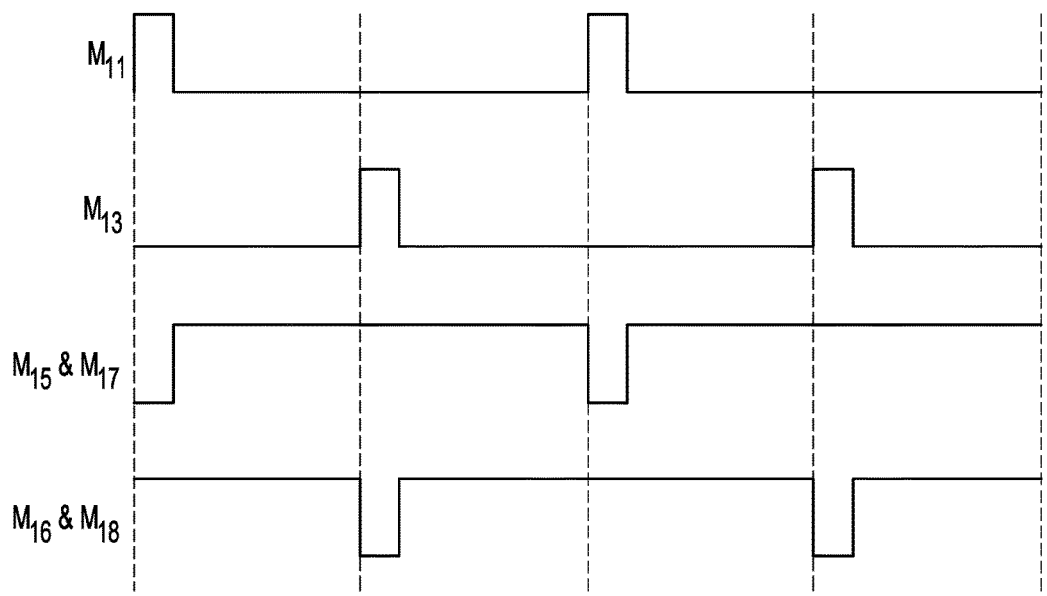
FIG. 7 is an illustration of waveforms of the control signals for the circuit of FIG. 6.

FIG. 6 is an example of a multi-phase transformer-based VR circuit with trans-inductor structure. The VR circuit includes a switching converter circuit and coupled-inductor circuits 608 that are trans-inductor structures that replace the output inductors L1-L4 of FIG. 5 and the output inductor/windings of FIG. 16. A coupled-inductor circuit 608 can be viewed as a 1:1 transformer, with a first winding and a second winding magnetically coupled to the first winding. The first windings ($L_{11}$, $L_{12}$, $L_{13}$, $L_{14}$) of the coupled-inductor circuits 608 are connected to the output node $V_{OUT}$. The second windings are all connected together in series to circuit ground. The example of FIG. 6 shows a two-segment secondary winding of the step down transformer 606 and a current doubler connected to each of the secondary winding segments, but the step down transformer secondary winding may include more than two segments and the regulator circuit may include more than two current doublers. The first winding of each of the coupled inductor circuits 608 is connected to an end of the secondary transformer winding segments. Because of the coupling of the coupled-inductor circuits 608, the output current of all the phases can ramp up or down at the same time once the duty cycle of one phase of the VR changes to respond to the load transient. Hence, the VR circuit with trans-inductor structure provides fast recovery to load transients. FIG. 7 is an illustration of waveforms of the control signals for the regulator circuit of FIG. 6.

Different secondary side circuits on the secondary side of the step down transformer 606 can be used in the example of FIG. 6, such as the full-bridge rectifier of FIG. 2, or the half-bridge rectifier of FIG. 3 for example. A full-bridge rectifier or half bridge rectifier is attached to each segment of the secondary transformer winding. The output inductor of the full-bridge rectifier or half bridge rectifier is replaced with a coupled-inductor circuit 608. The first winding of the coupled-inductor circuits 608 are connected to the output node $V_{OUT}$ and the second winding of the coupled-inductor circuits are connected together in series.

Figure 8:
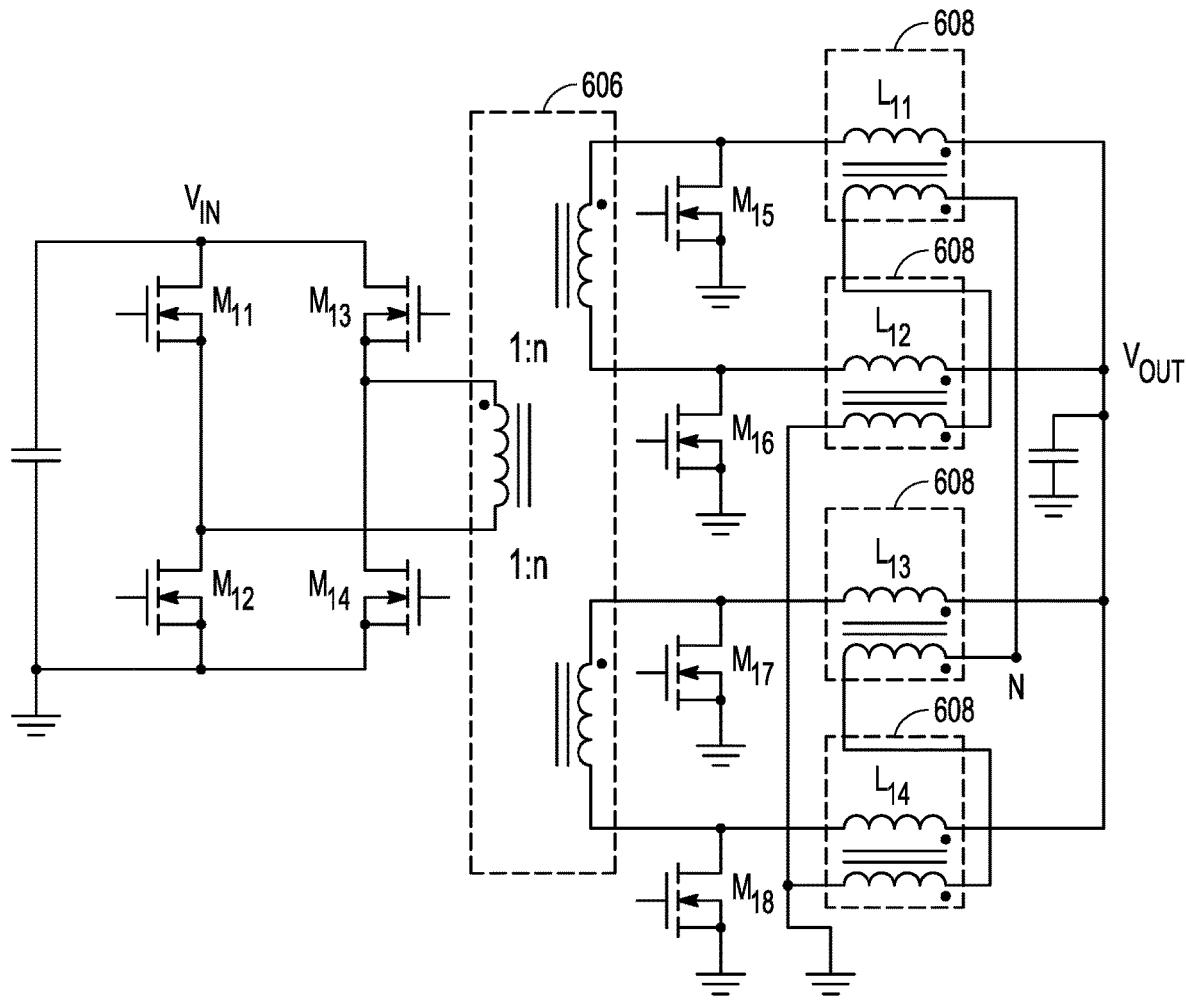
FIG. 8 is another example of a multi-phase transformer-based voltage regulator circuit with trans-inductor voltage regulator structures.

FIG. 8 is another example of a multi-phase transformer-based VR circuit with trans-inductor structures. Similar to the regulator circuit of FIG. 6, the circuit of FIG. 8 includes a switching converter circuit with trans-inductor structures that are coupled-inductor circuits 608. The coupled-inductor circuits 608 belonging to the same current doubler are connected in series, but the series-connected coupled-inductor circuits 608 of one current doubler are connected to circuit node N in parallel to the series-connected coupled-inductor circuits 608 of the other current doubler. Thus, the coupled-inductor circuits 608 of FIG. 8 have a series-parallel connection. As with the circuit of FIG. 6, other examples of the secondary side circuits of FIG. 8 can include a different secondary side circuit, such as the full-bridge rectifier of FIG. 2, or the half-bridge rectifier of FIG. 3.

Figure 9:
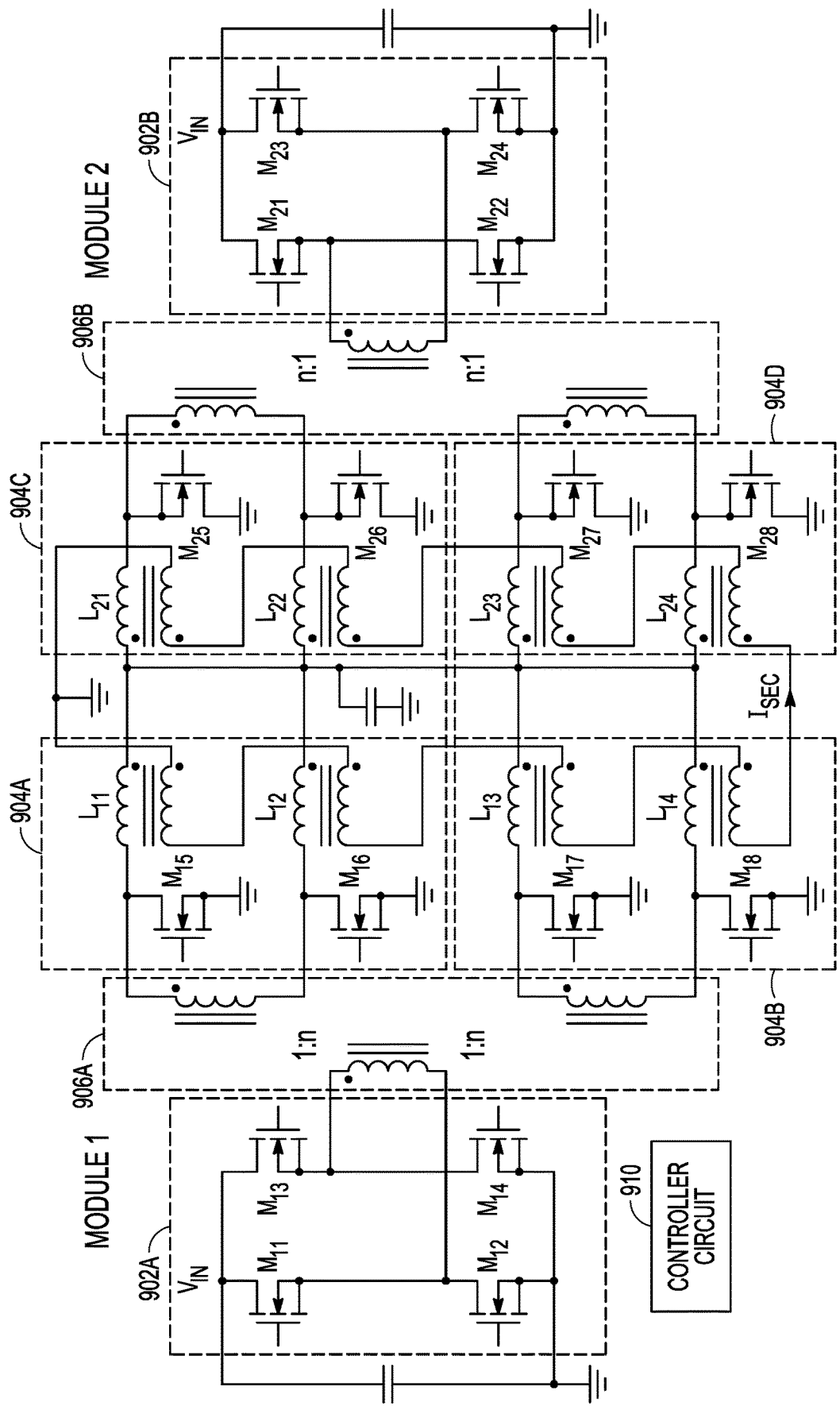
FIG. 9 is a further example of a multi-phase transformer-based voltage regulator circuit with trans-inductor voltage regulator structures.

FIG. 9 is another example of a multi-phase transformer-based VR circuit with trans-inductor structures. The regulator circuit of FIG. 9 includes two of the converter circuits of FIG. 6. The two converter circuits are switching converter circuits labeled "Module 1" and "Module 2."

Circuit Module 1 includes primary side switching circuit 902A that is a full bridge circuit connected to input $V_{IN}$. Primary side switching circuit 902A is also connected to the primary winding of isolation transformer 906A. Module 1 also includes two secondary side circuits 904A, 904B. The isolation transformer secondary winding includes two segments with each segment connected to a secondary side circuit. Circuit Module 2 includes primary side switching circuit 902A, isolation transformer 906B, and secondary side circuits 904C, 904D. The secondary side circuits 904A, 904B, 904C, 904D are current doublers with coupled-inductor circuits. The first winding of each of the coupled-inductor circuits is connected to the output node $V_{OUT}$, and the second windings of all the coupled-inductor circuits are connected in series to circuit ground.

Figure 10:
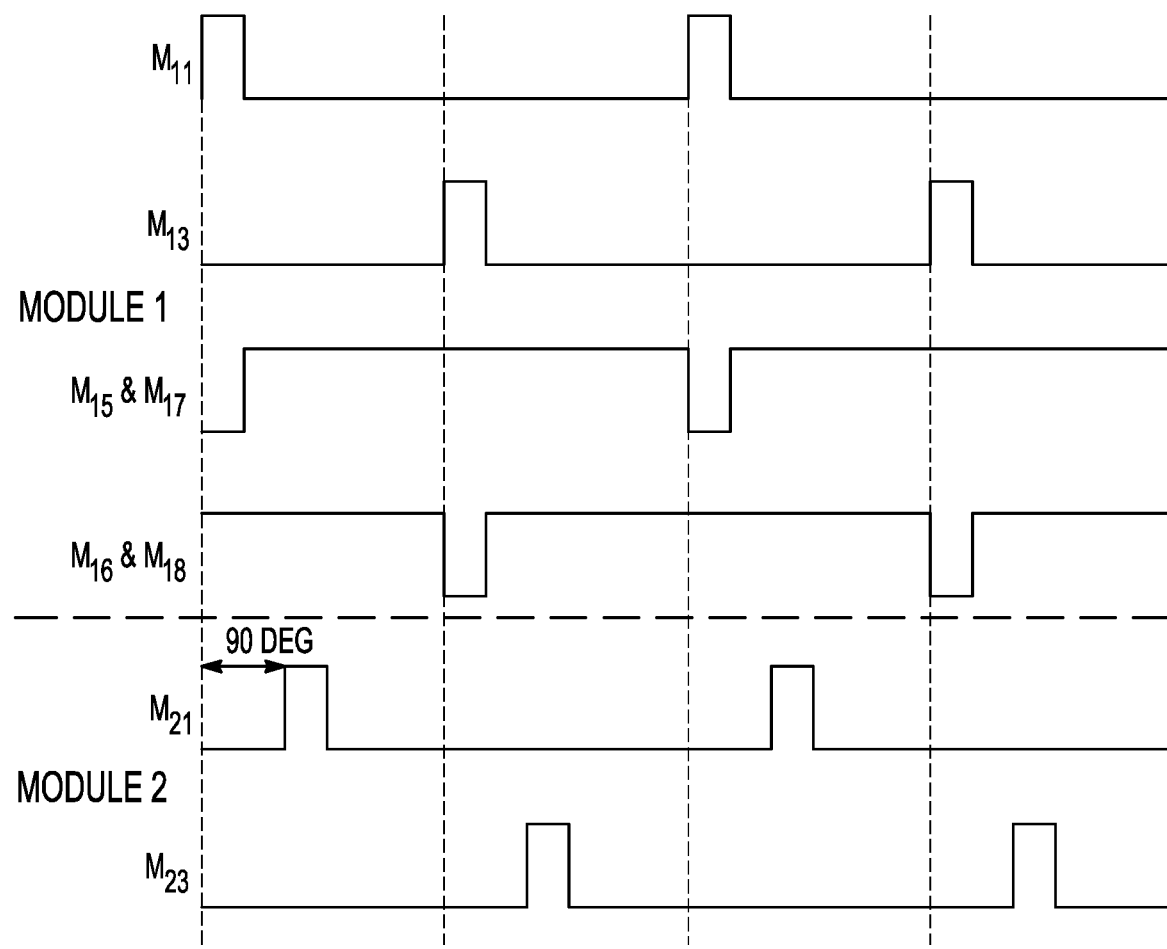
FIG. 10 is an illustration of waveforms of the control signals for the regulator circuit of FIG. 9.
Figure 11:
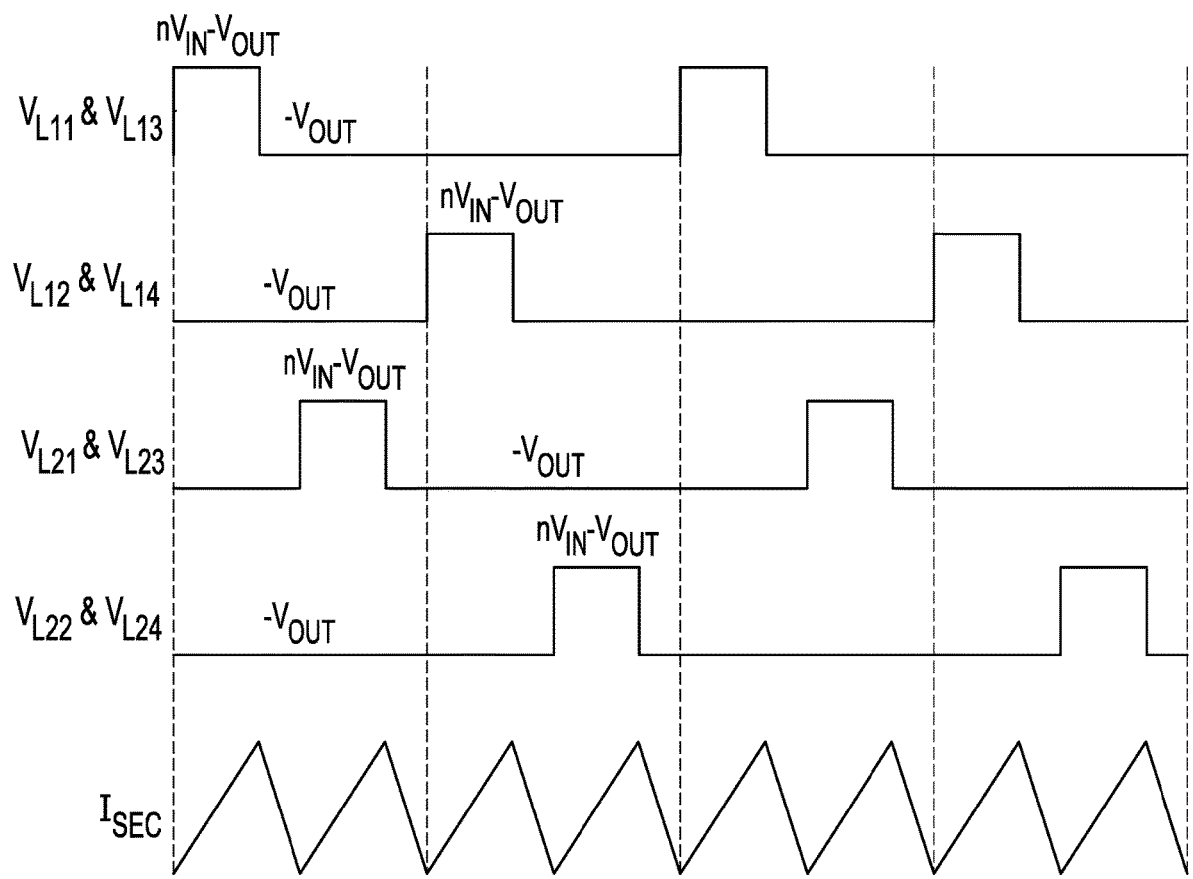
FIG. 11 is an illustration of voltage and current waveforms for the secondary windings of the coupled-inductor circuits shown in FIG. 9.

FIG. 10 is an illustration of waveforms of the control signals for the switching converter circuits of FIG. 9. The control signals are provided by controller circuit 910. The controller circuit 910 includes logic circuits to produce the timing of the control signals. The waveforms show that the switching of the primary side circuit of Module 2 is ninety degrees (90 deg) out of phase with the switching of the primary side circuit of Module 1. FIG. 11 shows the voltage waveforms and second side current ($I_{SEC}$) waveforms of the second windings of the coupled-inductor circuits of FIG. 9, where n is the turns ratio of the isolation transformers of FIG. 9.

Note that a compensation inductor (e.g., $L_C$ in FIG. 16) is not needed in any of the secondary side circuits of the examples in FIGS. 6, 8, and 9. Eliminating the need for this compensation inductor reduces cost and improves efficiency of the voltage regulators. If the transformers (e.g., transformers 906A, 906B) are step down transformers having a large turns ratio (e.g., 20:1), the volt-second applied in the coupled inductors is much smaller than that in conventional multi-phase VRs without a transformer. Hence, it is not necessary to introduce the additional compensation inductor in the secondary side circuits to limit the current ripple in the secondary side. The parasitic inductance in the circuit and the leakage inductance of the coupled inductors play a role in shaping the current $I_{SEC}$. The dynamic performance during the load transient can be further improved by reducing the leakage inductance and the parasitic inductance in the secondary side.

Figure 12:
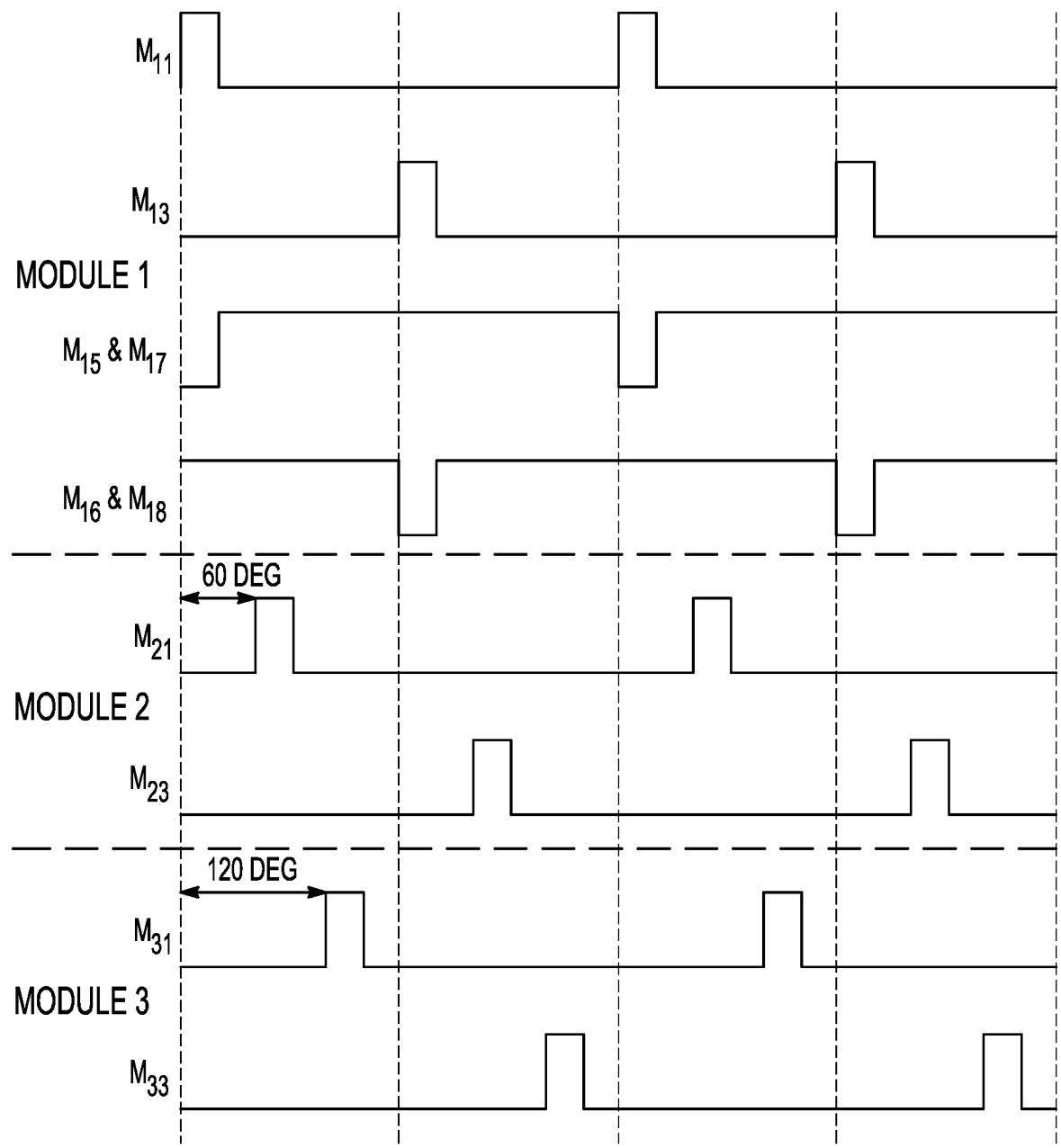
FIG. 12 is an illustration of waveforms of the control signals for a three-converter circuit version of a voltage regulator.

A third switching converter circuit (e.g., Module 3) can be added to the regulator circuit of FIG. 9. The secondary side circuit of the third switching converter circuit is connected to the output $V_{OUT}$ in parallel to the secondary side circuits of the first two switching converter circuits shown in FIG. 9. FIG. 12 is an illustration of waveforms of the control signals for the three-converter circuit version of the circuit of FIG. 9. The waveforms show that the controller circuit for the three-converter circuit would space the phase of the switching of the primary circuit sides of the three circuit modules evenly over 180 degrees. The switching of the primary switching circuit of Module 2 is 60 degrees out of phase with the switching of the primary switching circuit of Module 1, and the switching of the primary switching circuit of Module 3 is 120 degrees out of phase with the switching of the primary circuit side of Module 1. Additional converter circuits can be added to the regulator circuit of FIG. 9 so that the regulator circuit includes more than three switching converter circuits. The switching of the individual converter circuits is evenly out of phase with respect to each other and evenly spaced over 180 degrees of phase. For example, a four-converter circuit would have switching spaced at 0 degrees, 45 degrees, 90 degrees, and 135 degrees.

Figure 13:
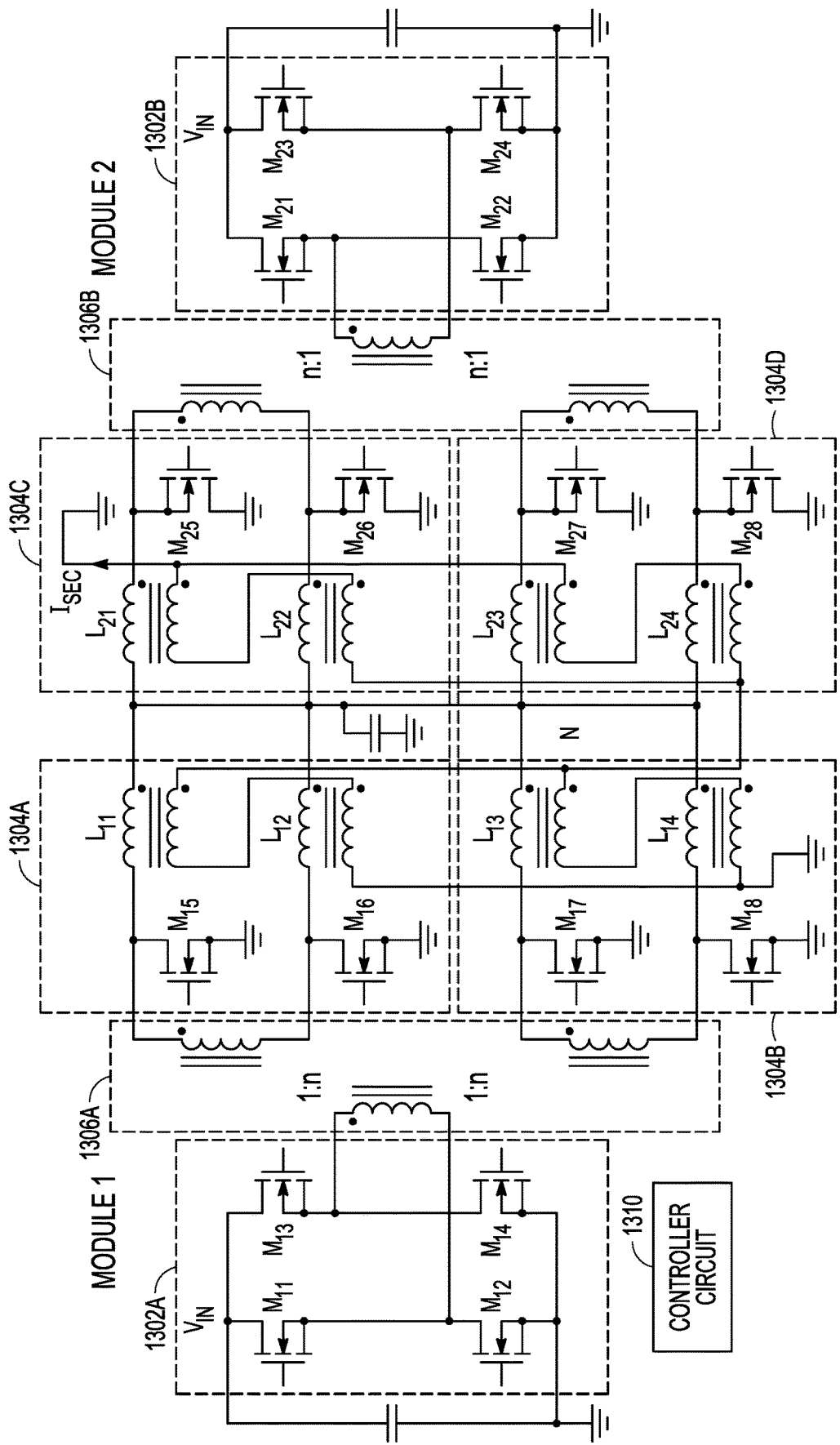
FIG. 13 is still another example of a multi-phase transformer-based voltage regulator circuit with trans-inductor voltage regulator structures.

FIG. 13 is another example of a multi-phase transformer-based VR circuit with trans-inductor structures. The regulator circuit of FIG. 13 includes two of the switching converter circuits of FIG. 8. As in the example of FIG. 9, the two switching converter circuits are labeled "Module 1" and "Module 2." Circuit Module 1 includes primary side switching circuit 1302A and secondary side circuits 1304A, 1304B connected to isolation transformer 1306A. Circuit Module 2 includes primary side switching circuit 1302B and secondary side circuits 1304C, 1304D connected to isolation transformer 1306B. The isolation transformers 1306A, 1306B include a primary winding and a multi-segment (e.g., two-segment) secondary winding. The primary side switching circuits 1302A, 1302B are full bridge circuits connected to the input voltage $V_{IN}$ and to the primary winding of the corresponding isolation transformer.

The secondary side circuits 1304A, 1304B, 1304C, 1304D are current doubler circuits and are connected to a segment of a multi-segment secondary winding. The secondary side circuits 1304A, 1304B, 1304C, 1304D include coupled-inductor circuits. The first windings of the coupled-inductor circuits are connected to the output of the regulator circuit $V_{OUT}$. The first windings of the coupled-inductor circuits are also connected to the ends of segments of the secondary winding of the isolation transformer. For instance, first windings L11 and L12 of the coupled-inductor circuits of secondary side circuit 1304A are connected to different ends of the same first segment of the secondary winding of transformer 1306A. The corresponding second windings of L11 and L12 are connected together in series. Similarly, first windings L13 and L14 of the coupled-inductor circuits of secondary side circuit 1304B are connected to different ends of the same second segment of the secondary winding of transformer 1306A. The corresponding second windings of L13 and L14 are also connected together in series.

The difference between the regulator circuits of FIG. 9 and FIG. 13, is that the series connected second windings of secondary side circuit 1304A are connected to circuit node N and ground in parallel with the series connected second windings of secondary side circuit 1304B. Also, the series connected second windings of secondary side circuit 1304C are connected to circuit node N and ground in parallel with the series connected second windings of secondary side circuit 1304D. Thus, in FIG. 13 the second windings of the coupled-inductor circuits have a series-parallel connection.

The controller circuit 1310 includes logic circuits to produce the timing of the control signals for the switching converter circuits of FIG. 13. The control signals for the switching converter circuits of FIG. 13 are the same as the control signals for the switching converter circuits of the FIG. 9, and the control signals have the same waveforms of FIG. 10. A third switching converter circuit (e.g., Module 3) can be added to the circuit of FIG. 13, by connecting the secondary side circuit of the third switching converter circuit to output $V_{OUT}$ in parallel to the secondary side circuit of the first two regulator circuits shown in FIG. 13. The control signals for the three-converter circuit version of the circuit of FIG. 13 is the same as the control signals shown in FIG. 12.

Figure 17A:
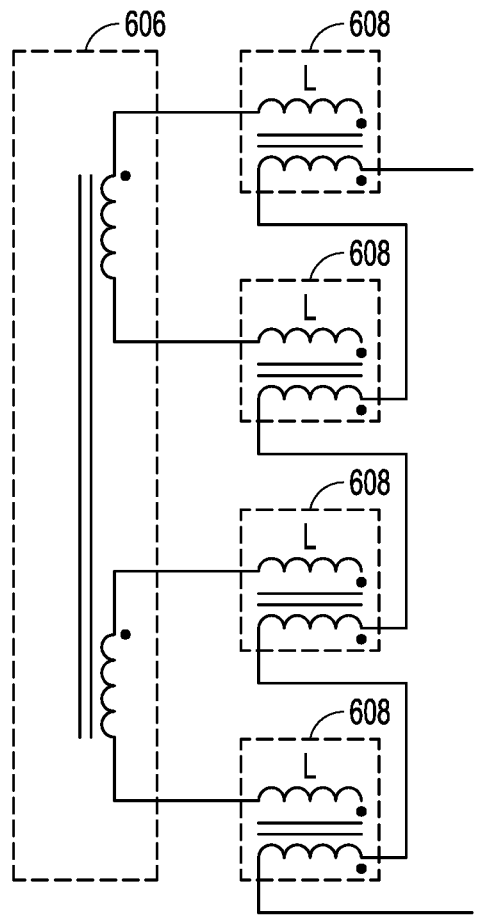
FIG. 17A is a circuit schematic of the two-segment secondary winding of the transformer of the VR circuit example of FIG. 6.
Figure 17B:
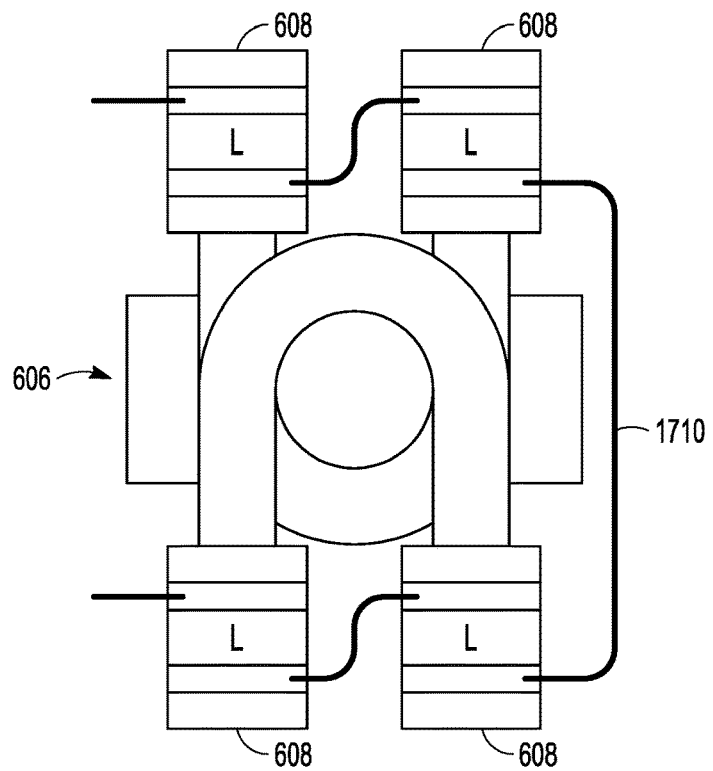
FIG. 17B is a circuit layout of the secondary transformer windings of the planar transformer and the coupled-inductor circuits of FIG. 17A.
Figure 18:
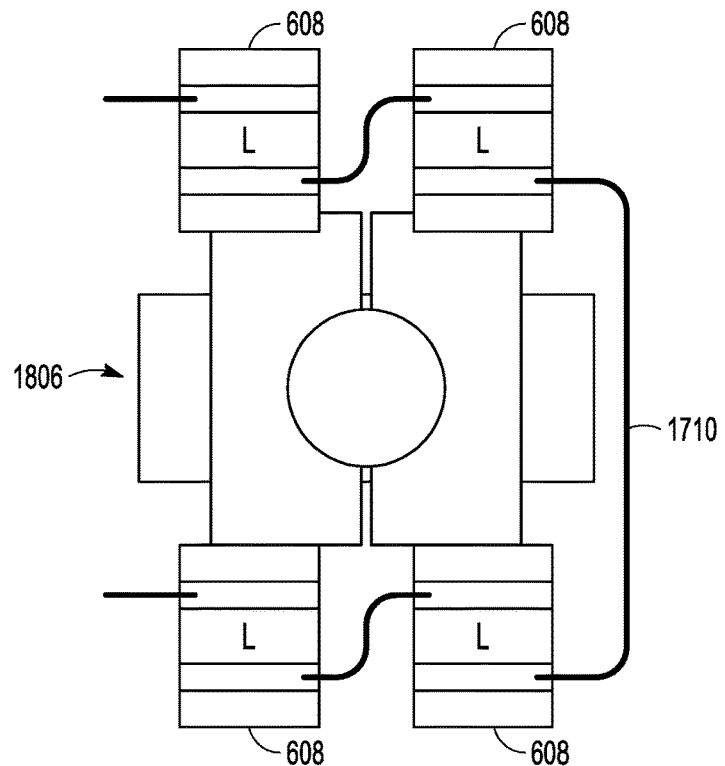
FIG. 18 is a circuit layout of another example of secondary transformer windings of the planar transformer and coupled-inductor circuits useable in the example of FIG. 17A.

The isolation transformers shown in the several examples can be planar transformers formed in layers of a substrate. FIG. 17A is a circuit schematic of the two-segment secondary winding of the transformer 606 of the VR circuit example of FIG. 6 and the series connected coupled-inductor circuits 608. The primary transformer winding and the switching transistors are not shown. The transformer 606 can be a planar transformer. FIG. 17B is a circuit layout of the secondary transformer windings 606 of the planar transformer and the coupled-inductor circuits 608 of FIG. 17A. Each segment of the secondary transformer winding 606 has one turn. Each of the turns is planar and is formed in a layer of a multi-layer substrate of the VR circuit. The conductive interconnect 1710 shows the series connection of the coupled-inductor circuits 608. FIG. 18 is a circuit layout of the secondary transformer windings and the coupled-inductor circuits 608 of FIG. 17A. In the example of FIG. 18, each segment of the secondary transformer winding 1806 has one-half turn. Each of the half-turns is planar and is formed in a layer of a multi-layer substrate of the VR circuit.

Figure 19A:
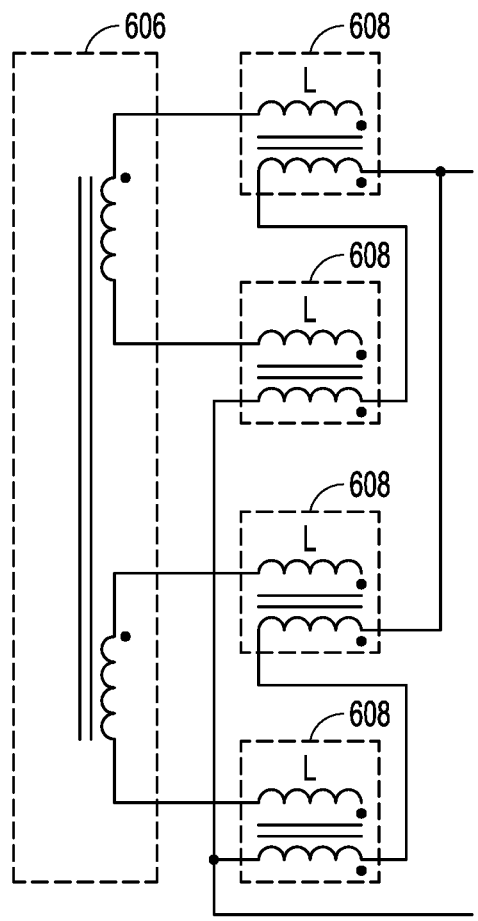
FIG. 19A is a circuit schematic of the two-segment secondary winding of the transformer of the VR circuit example of FIG. 8.
Figure 19B:
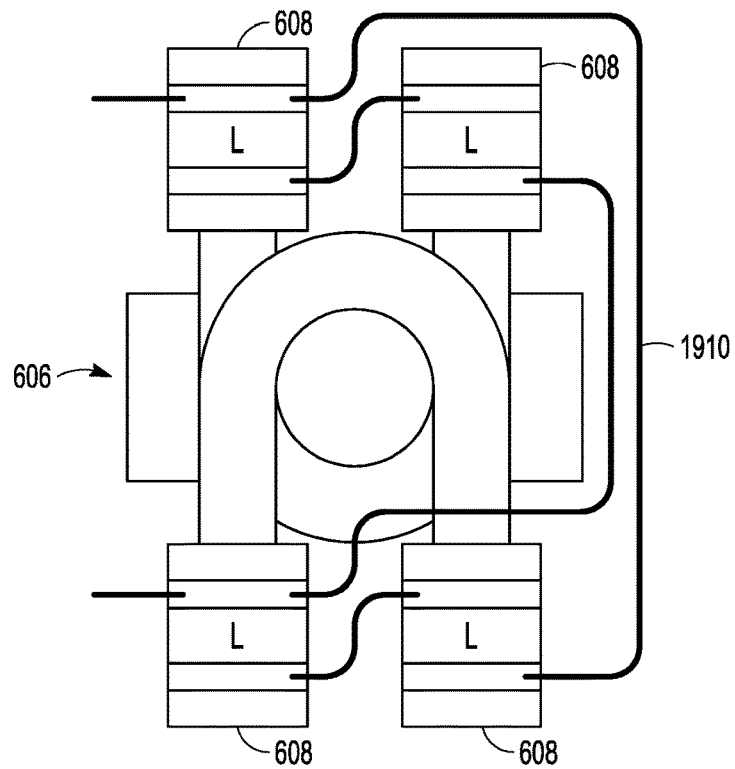
FIG. 19B is a circuit layout of the secondary transformer windings of the planar transformer and the coupled-inductor circuits of FIG. 19A.
Figure 20:
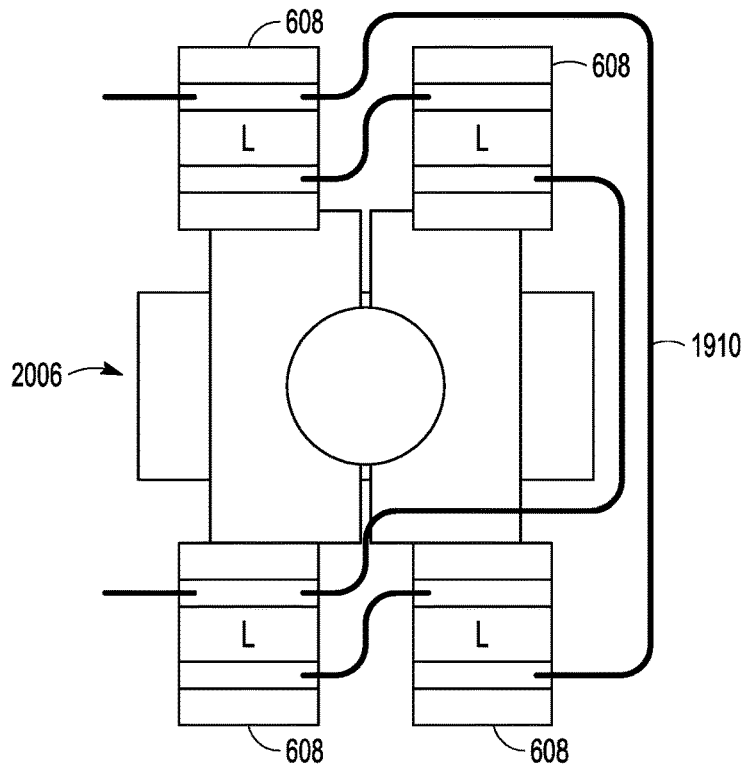
FIG. 20 is a circuit layout of another example of secondary transformer windings of the planar transformer and coupled-inductor circuits useable in the example of FIG. 19A.

FIG. 19A is a circuit schematic of the two-segment secondary winding of the transformer 606 and the series-parallel connected coupled-inductor circuits 608 of the circuit example of FIG. 8. FIG. 19B shows the circuit layout of the one-turn secondary transformer windings 606 and the coupled inductor circuits 608. The transformer is planar and each of the turns is formed in a layer of a substrate. The conductive interconnect 1910 shows the series-parallel connection of the coupled-inductor circuits 608. FIG. 20 is a circuit layout of the secondary transformer windings and the coupled-inductor circuits 608 of FIG. 19A. In the example of FIG. 20, each segment of the secondary transformer winding 2006 has one-half turn.

Figure 21:
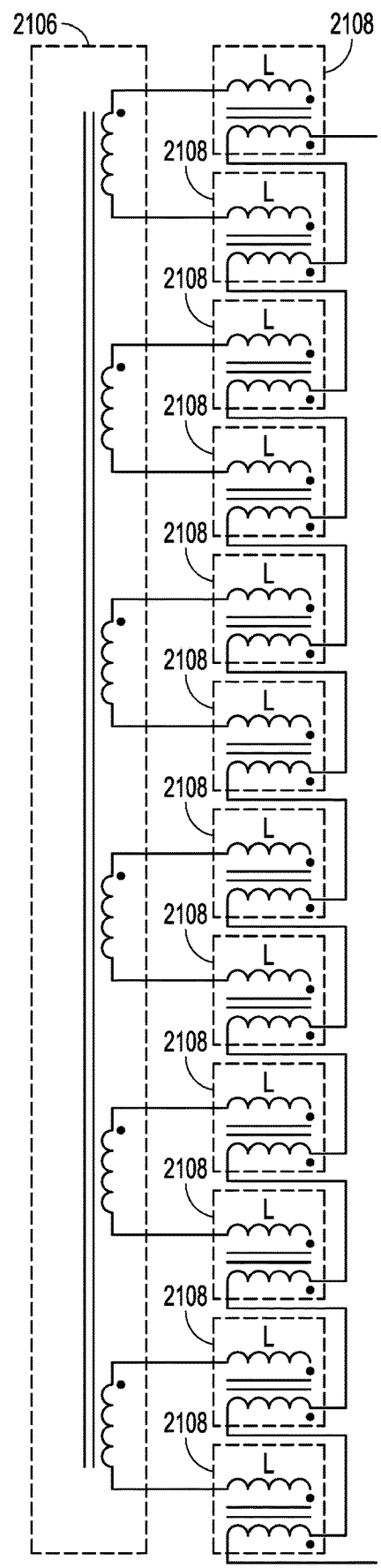
FIG. 21 is a circuit schematic of another example of a multi-segment secondary transformer winding of an isolation transformer of a multi-phase voltage regulator circuit.
Figure 22:
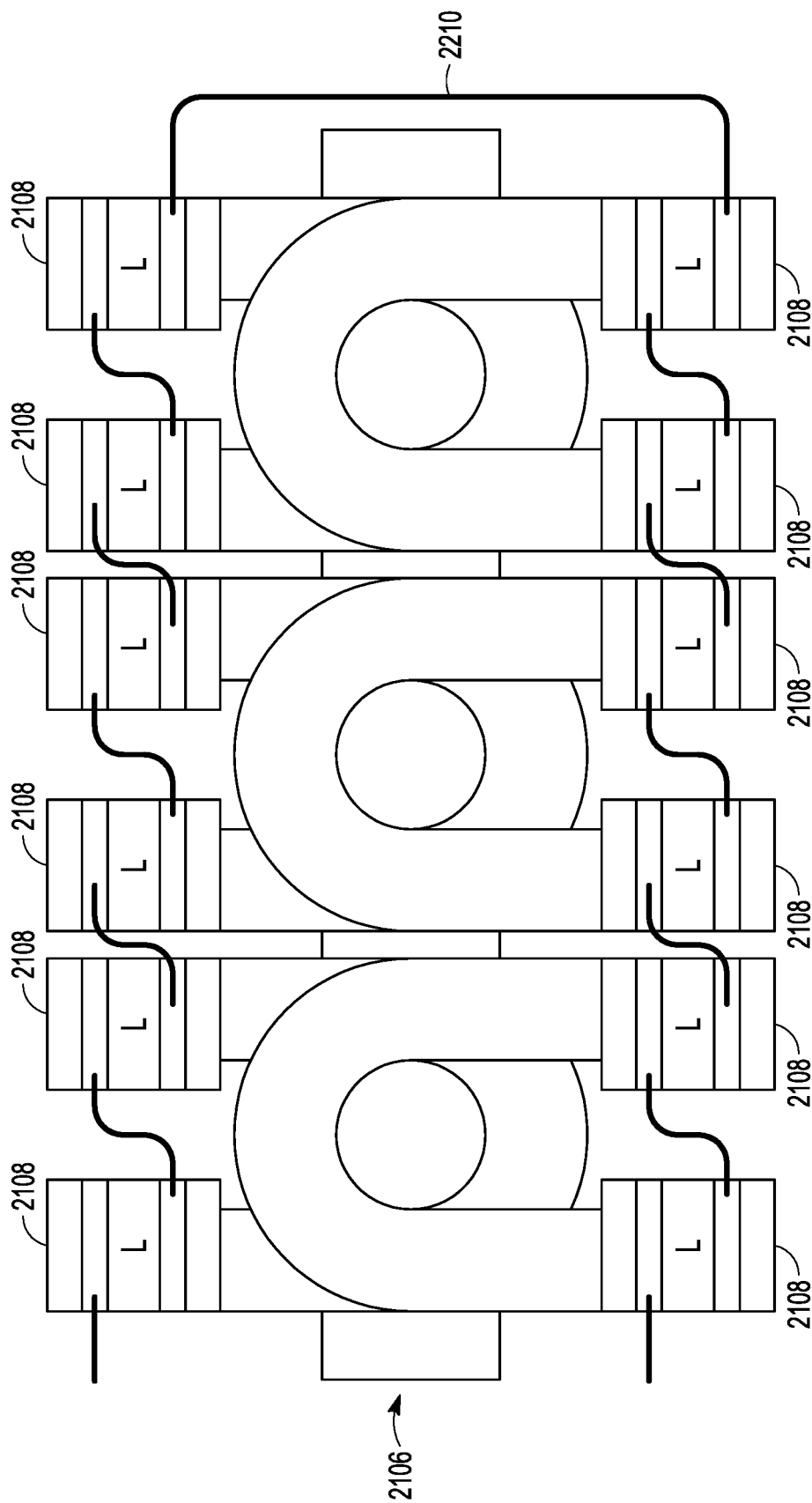
FIG. 22 is a circuit layout of a planar multi-segment secondary transformer winding and coupled-inductor circuits of the example of FIG. 21.

FIG. 21 is a circuit schematic of another example of a multi-segment secondary transformer winding 2106 of an isolation transformer of a multi-phase voltage regulator circuit. The primary winding of the transformer is not shown. The secondary transformer winding has 6 segments. A coupled-inductor circuit 2108 is connected to each of the ends of the 6 segments for a total of 12 coupled-inductor circuits 2108. In the example of FIG. 21, the coupled-inductor circuits 2108 are connected in series. The isolation transformer can be a planar transformer. FIG. 22 is a circuit layout of a planar 6-segment secondary transformer winding 2106 and the coupled-inductor circuits 2108. Each of the segments has one turn. The conductive interconnect 2210 shows the series connection of the coupled-inductor circuits 2108.

Figure 23:
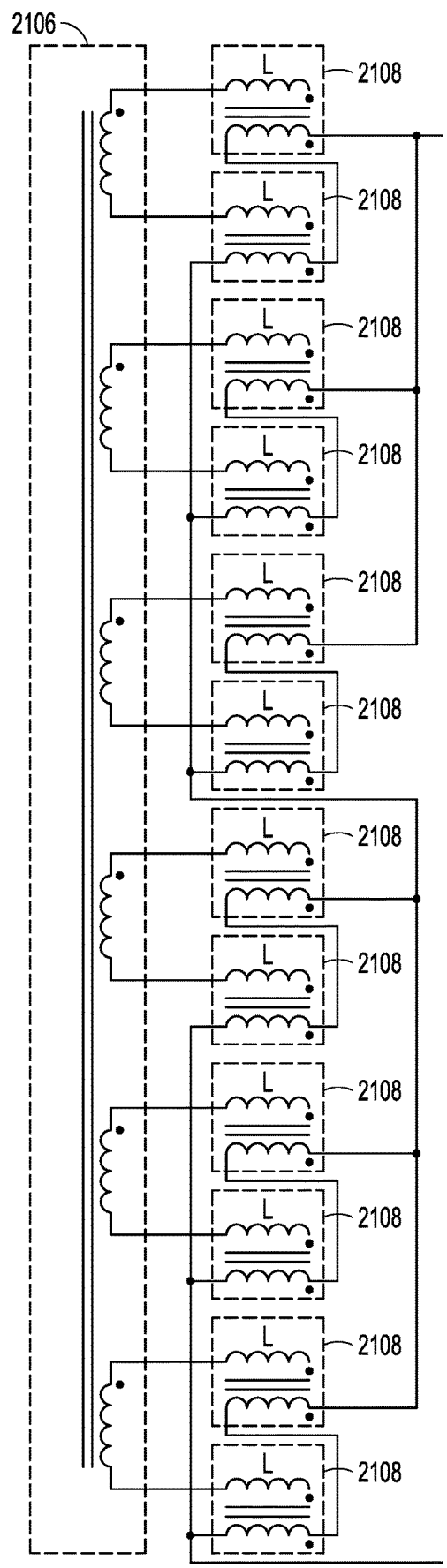
FIG. 23 is a circuit schematic of another example of a multi-segment secondary transformer winding of a planar isolation transformer of a multi-phase voltage regulator circuit.
Figure 24:
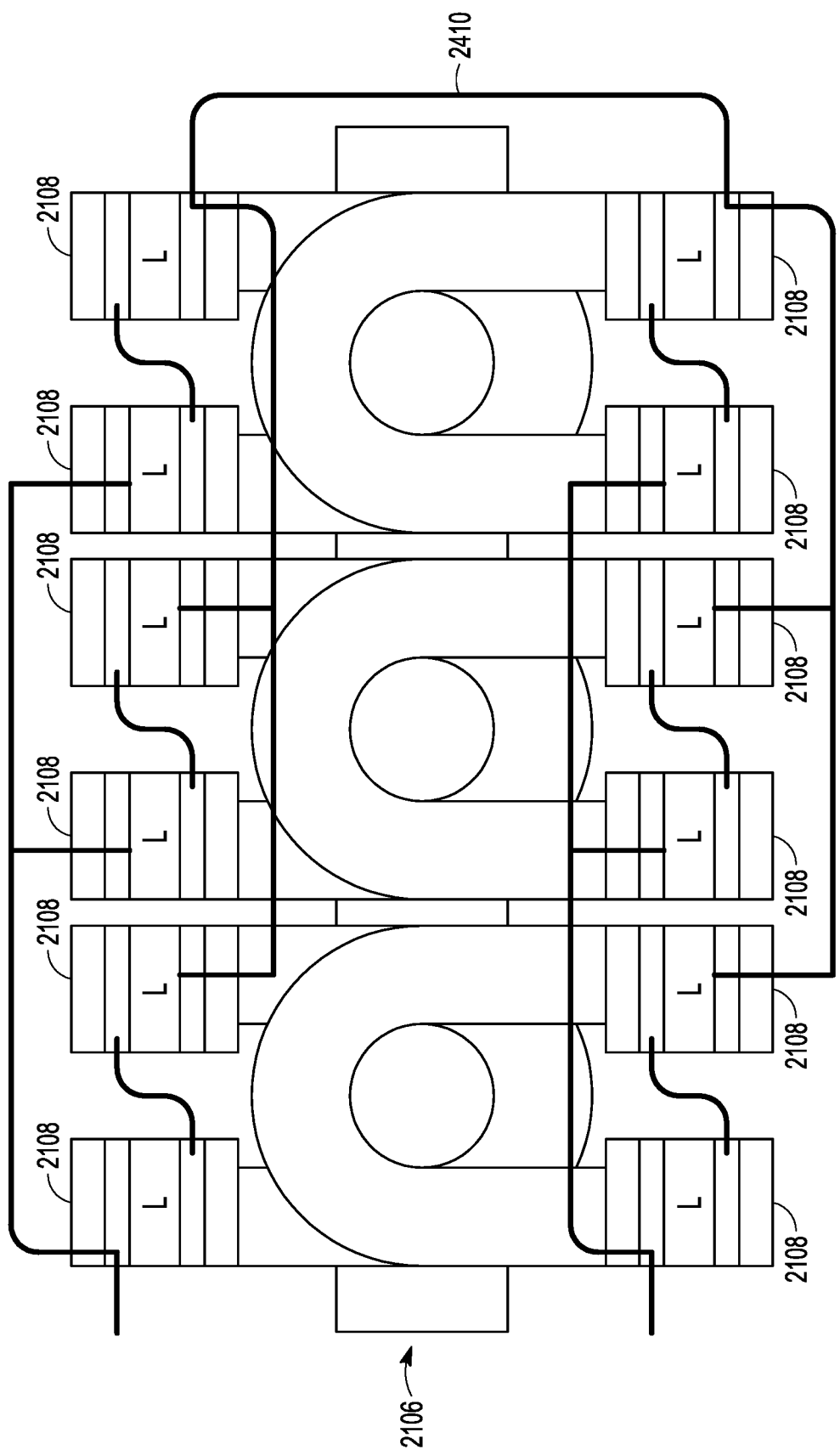
FIG. 24 is a circuit layout of a planar multi-segment secondary transformer winding and coupled-inductor circuits of the example of FIG. 23.

FIG. 23 is a circuit schematic of another example of a 6-segment secondary transformer winding 2106 of a planar isolation transformer of a multi-phase voltage regulator circuit. In the example of FIG. 23, the coupled-inductor circuits 2108 are connected in series-parallel. FIG. 24 is a circuit layout of a planar 6-segment secondary transformer winding 2106 and the coupled-inductor circuits 2108. The conductive interconnect 2410 shows the series-parallel connection of the coupled-inductor circuits 2108.

Figure 14:
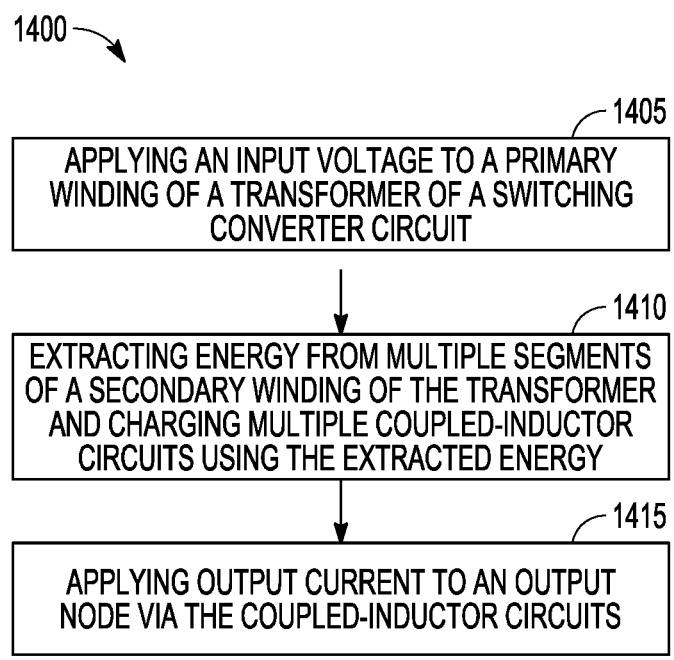
FIG. 14 is flow diagram of an example of a method of operating a multi-phase regulator circuit.

As an overview, FIG. 14 is a flow diagram of a method of operating a multi-phase regulator circuit. At block 1405, an input voltage is applied to a primary winding of a transformer of a switching converter circuit of the multi-phase regulator circuit. In some examples, the input voltage is applied to the primary winding of an isolation transformer using a full-bridge switching circuit, as shown in the examples of FIGS. 6, 8, 9 and 13. In variations, the input voltage is applied to the primary winding using a different primary side switching circuit such as a half-bridge switching circuit for example.

At block 1410, energy is extracted from multiple segments of a secondary winding of the transformer. The energy is extracted using multiple secondary side circuits. Some examples of the secondary side circuit used to receive the energy from the transformer include a full-bridge rectifier circuit, half-bridge rectifier circuit, and a current doubler circuit. Each segment of the secondary winding of the transformer is connected to a separate secondary side circuit. The extracted energy is used to charge coupled-inductor circuits of the secondary side circuits. Each of the coupled-inductor circuits include a first winding and a second winding.

The first and second windings are magnetically coupled. The first winding of the coupled-inductor circuits is connected to the output node of the multi-phase regulator circuit. The second winding of the coupled-inductor circuits is connected to the second winding of another coupled-inductor circuit. In some examples, the second windings of the coupled-inductor circuits of the secondary side circuits are connected in series and in the circuit examples of FIGS. 6 and 9. In some examples, the second windings of the coupled-inductor circuits of the secondary side circuits have a parallel connection to another second winding as in the circuit examples of FIGS. 8 and 13.

At block 1415, output current is applied to the output node of the multi-phase regulator circuit. The current from the secondary side circuits is provided on different phases by energizing and de-energizing the coupled inductors of different secondary side circuits on different phases. This divides the current requirements among the secondary side circuits. Additionally, multiple switching converter circuits can be connected in parallel to the output node as in the examples of FIGS. 9 and 13.

Figure 15:
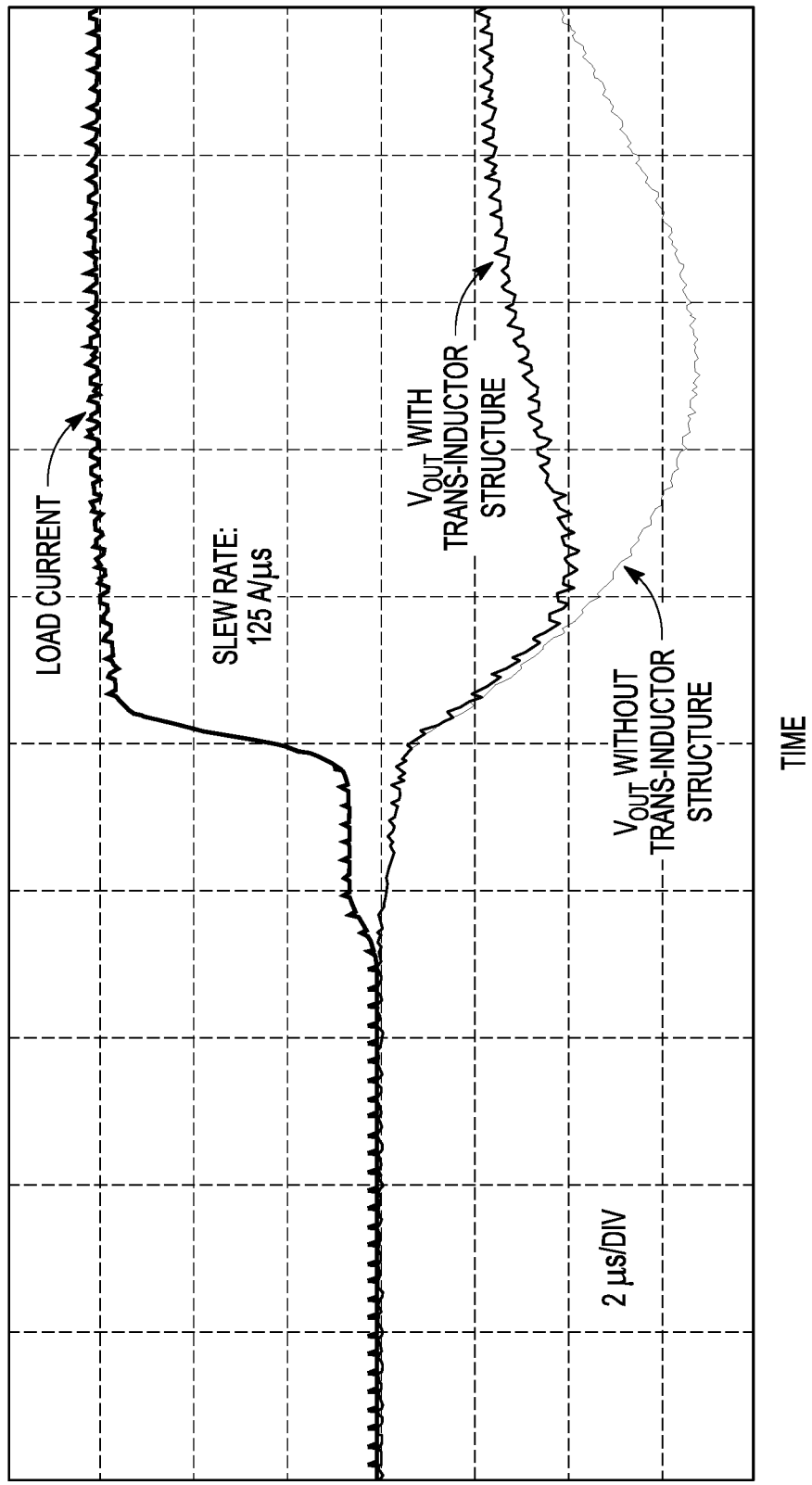
FIG. 15 is a graph illustrating the load transient response of a regulator circuit with trans-inductor voltage regulator structures.

FIG. 15 is a graph illustrating the load transient response of a transformer-based voltage regulator circuit with trans-inductor structures (such as the coupled-inductor circuits 608) and a regulator circuit without trans-inductor structures. It can be seen in the waveforms that, as the load current steps up from 20 A to 170 A, the regulator circuit with trans-inductor structures can recover to regulate the output voltage more quickly than the regulator without trans-inductor structures. Also, the control bandwidth increases from about 45 kiloHetz (45 kHz) to 83 kHz with the addition of trans-inductor structures.

The two options of connections for the coupled-inductor circuits 608 of the regulator circuits, whether the series connection of FIGS. 6 and 9 or the series-parallel connection of FIGS. 8 and 13, provide improved response to load transients. For the multi-phase regulator circuits of FIGS. 6, 8, 9, and 13, the output current of all the secondary side circuits can ramp up or down at the same time once the duty cycle of one phase of the regulators changes to respond to the load transient. The extremely fast transient response allows for a much smaller capacitance to be used at the output.

For the parallel multi-converter regulators of FIGS. 9 and 13, distributing the control signals across different phases can reduce the output voltage ripple. Also, the current ripple of secondary side current $I_{SEC}$ can be reduced, and hence the conduction loss in the second windings of the coupled-inductor circuit can be suppressed. No additional dedicated current ripple limiting inductors are required. Such dedicated current ripple limiting inductors can be connected between the second windings of the coupled inductors and circuit ground, but the performance of the regulator circuits described herein eliminate the need for such additional inductors.

The two options of connections for the coupled-inductor circuits 608 of the regulator circuits provide flexibility for the designer in choosing which is the best approach for their implementation. The coil windings of the coupled-inductor circuits 608 can be included in metal layers of a printed circuit board (PCB). The PCB can include metal traces to connect the second windings of the coupled inductor circuits in the series connection of the circuits of FIGS. 6 and 9, or the series-parallel connection of the circuits of FIGS. 8 and 13. Thus, the coupling between the coupled-inductor circuits 608 can be implemented with simple metal PCB traces and the coupling does not need a common magnetic material.

The several examples of systems, devices, and methods described provide transformer-based voltage regulators with high output current to improve load transient performance. The proposed regulator structures can be applied in various transformer-based voltage regulator circuit topologies with multiple secondary windings and output inductors. Specifically, two connections have been developed to realize the proposed transformer-based voltage regulator circuits with trans-inductor structures, including a series connection version and a series-parallel connection version. The proposed transformer-based voltage regulator circuits with trans-inductor structures can cover voltage regulators with multiple voltage converters operating in parallel. No additional compensation inductors need to be connected to the second windings of the trans-inductor structures.

ADDITIONAL DESCRIPTION AND ASPECTS

A first Aspect (Aspect 1) includes subject matter (such as a multi-phase regulator circuit) comprising one or more switching converter circuits. Each switching converter circuit includes a transformer including a primary winding and a multi-segment secondary winding; a primary side switching circuit configured to connect the primary winding to an input of the multi-phase regulator circuit; and multiple secondary side circuits including multiple coupled-inductor circuits. Each coupled-inductor circuit including a first winding magnetically coupled to a second winding; each segment of the transformer multi-segment secondary winding is connected to the first winding of a coupled-inductor circuit; and each of the first windings is connected to an output of the multi-phase regulator circuit.

In Aspect 2, the subject matter of Aspect 1 optionally includes the second windings of the multiple coupled-inductor circuits connected together in series to a circuit ground.

In Aspect 3, the subject matter of Aspect 2 optionally includes a first switching converter circuit and a second switching converter circuit. The second windings of the multiple coupled-inductor circuits of the first switching converter circuit are connected in series to the multiple coupled-inductor circuits of the second switching converter circuit.

In Aspect 4, the subject matter of one or both of Aspects 2 and 3 optionally includes a printed circuit board (PCB), wherein the first and second windings of the coupled-inductor circuits are included in layers of the PCB; wherein the second windings of the coupled-inductor circuits are connected in series in the layers of the PCB.

In Aspect 5 the subject matter of Aspect 1 optionally includes the second windings of the coupled-inductor circuits connected to ends of the same segment of the transformer multi-segment secondary winding are connected together in series to a circuit ground; and the series connected second windings of the coupled-inductor circuits connected to different segments of the transformer multi-segment secondary winding are connected in parallel.

In Aspect 6, the subject matter of Aspect 5 optionally includes a first switching converter circuit and a second switching converter circuit; and the series connected second windings of the coupled-inductor circuits of the first switching converter circuit are connected in parallel to the series connected second windings of the coupled-inductor circuits of the second switching converter circuit.

In Aspect 7, the subject matter of one or any combination of Aspects 5-6 optionally includes the one or more switching converter circuits include a third switching converter circuit; and the series connected second windings of the coupled-inductor circuits of the third switching converter circuit are connected in parallel to the series connected second windings of the coupled-inductor circuits of the first and second switching converter circuits.

In Aspect 8, the subject matter of Aspect 7 optionally includes a controller circuit configured to control activation of the primary side switch circuits of the first, second, and third switching converter circuits to connect the corresponding transformers of the first, second, and third switching converter circuits to the input of the multi-phase regulator circuit evenly out of phase with respect to each other.

In Aspect 9, the subject matter of one or any combination of Aspects 5-8 optionally includes a printed circuit board (PCB), wherein the first windings and second windings of the coupled-inductor circuits are included in layers of the PCB; and the coupled-inductor circuits are connected in parallel in the layers of the PCB.

In Aspect 10, the subject matter of one or any combination of Aspects 1-9 optionally includes each of the first windings of the multiple coupled-inductor circuits are connected to the segment of the multi-segment secondary transformer winding in a current doubler topology.

In Aspect 11, the subject matter of one or any combination of Aspects 1-10 optionally includes each of the first winding of the multiple coupled-inductor circuits connected to a segment of the multi-segment secondary transformer winding in a full bridge rectifier topology.

In Aspect 12, the subject matter of one or any combination of Aspects 1-10 optionally includes the first windings of the multiple coupled-inductor circuits are connected to a segment of the multi-segment secondary transformer winding in a full-wave rectifier topology.

In Aspect 13, the subject matter of one or any combination of Aspects 1-12 optionally includes the second windings of the multiple coupled-inductor circuits not connected in series to a dedicated current ripple limiting inductor.

Aspect 14 includes subject matter (such as a method of operating a multi-phase regulator circuit) or can optionally be combined with one or any combination of Examples 1-13 to include such subject matter, comprising applying an input voltage to a primary winding of a transformer of a switching converter circuit of the multi-phase regulator circuit; extracting energy from multiple segments of a secondary winding of the transformer and charging multiple coupled-inductor circuits using the extracted energy, wherein a coupled-inductor circuit includes a first winding magnetically coupled to a second winding, and the second winding of the coupled-inductor circuit connected to a second winding of another coupled-inductor circuit; and applying output current to an output node via the coupled-inductor circuits.

In Aspect 15, the subject matter of Aspect 14 optionally includes applying the input voltage to multiple primary windings of multiple transformers of multiple switching converter circuits; the multiple switching converter circuits each include a secondary circuit side that includes the transformer secondary winding and multiple coupled-inductor circuits; and applying output current from the multiple secondary circuit sides that are connected in parallel to the output node.

In Aspect 16, the subject matter of Aspect 15 optionally includes the second windings of the coupled-inductor circuits of the multiple secondary circuit sides are connected together in series.

In Aspect 17, the subject matter of Aspect 15 optionally includes a second winding of a coupled-inductor circuit of one secondary circuit side is connected in parallel to a second winding of another coupled inductor circuit of another secondary circuit side.

Aspect 18 can include subject matter (such as a multi-phase regulator circuit) or can optionally be combined with one or any combination of Aspects 1-17 to include such subject matter, comprising multiple switching converter circuits each coupled to an input and a common output node of the multi-phase regulator circuit, and a controller circuit coupled to the multiple switching converter circuits. Each switching converter circuit includes a step-down transformer including a primary winding and multiple secondary windings; a primary side circuit stage coupled to the input and the primary winding of the step-down transformer and including at least one primary side switch; and a secondary side circuit stage coupled to the multiple secondary windings of the step-down transformer, and including at least one secondary side switch and one or more coupled-inductor circuits coupled to the common output node. The controller circuit is configured to generate multiple activation signals to activate the primary side switch of a switching converter circuit out of phase with the at least one primary side switch of another switching converter circuit; and generate multiple activation signals to the secondary side switch circuits to provide electrical energy to the coupled-inductor circuits.

In Aspect 19, the subject matter of Aspect 18 optionally includes the coupled-inductor circuits of all the switching converter circuits are connected in series.

In Aspect 20, the subject matter of one or both of Aspects 18 and 19 optionally includes the coupled-inductor circuits of one switching converter circuit connected in parallel with the coupled-inductor circuits of the other switching converter circuits'

In Aspect 21, the subject matter of one or any combination of Aspects 18-20 optionally includes one or more coupled-inductor circuits that include first windings magnetically coupled to second windings, and the multi-phase regulator circuit does not include a compensation inductor connected to the second windings of the coupled-inductor circuits.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A multi-phase regulator circuit, the regulator circuit comprising:
   one or more switching converter circuits, each switching converter circuit including:
   a transformer including a primary winding and a multi-segment secondary winding;
   a primary side switching circuit configured to connect the primary winding to an input of the multi-phase regulator circuit;
   multiple secondary side circuits including multiple coupled-inductor circuits, each coupled-inductor circuit including a first winding and a second winding magnetically coupled to the first winding;
   wherein each respective segment of the multi-segment secondary winding of the transformer is connected to the first winding of a respective coupled-inductor circuit and the first winding the respective coupled-inductor circuit is connected to an output of the multi-phase regulator circuit; and
   wherein second windings of the multiple coupled-inductor circuits are connected together in series to a circuit ground.

2. The regulator circuit of claim 1,
   wherein the one or more switching converter circuits include a first switching converter circuit and a second switching converter circuit; and
   wherein the second windings of the multiple coupled-inductor circuits of the first switching converter circuit are connected in series to the multiple coupled-inductor circuits of the second switching converter circuit.

3. The regulator circuit of claim 1, including:
   a printed circuit board (PCB), wherein the first and second windings of the coupled-inductor circuits are included in layers of the PCB; and
   wherein the second windings of the coupled-inductor circuits are connected in series in the layers of the PCB.

4. The regulator circuit of claim 1,
   wherein the second windings of the coupled-inductor circuits connected to ends of the same segment of the transformer multi-segment secondary winding are connected together in series to the circuit ground; and
   wherein the series connected second windings of the coupled-inductor circuits connected to different segments of the transformer multi-segment secondary winding are connected in parallel.

5. The regulator circuit of claim 4,
   wherein the one or more switching converter circuits include a first switching converter circuit and a second switching converter circuit; and
   wherein the series connected second windings of the coupled-inductor circuits of the first switching converter circuit are connected in parallel to the series connected second windings of the coupled-inductor circuits of the second switching converter circuit.

6. The regulator circuit of claim 5,
   wherein the one or more switching converter circuits include a third switching converter circuit; and
   wherein the series connected second windings of the coupled-inductor circuits of the third switching converter circuit are connected in parallel to the series connected second windings of the coupled-inductor circuits of the first and second switching converter circuits.

7. The regulator circuit of claim 6, including:
   a controller circuit configured to control activation of the primary side switch circuits of the first, second, and third switching converter circuits to connect the corresponding transformers of the first, second, and third switching converter circuits to the input of the multi-phase regulator circuit evenly out of phase with respect to each other.

8. The regulator circuit of claim 4, including:
   a printed circuit board (PCB), wherein the first windings and second windings of the coupled-inductor circuits are included in layers of the PCB; and
   wherein the coupled-inductor circuits are connected in parallel in the layers of the PCB.

9. The regulator circuit of claim 1, wherein each first winding of the multiple coupled-inductor circuits is connected to a respective segment of the multi-segment secondary transformer winding in a current doubler topology.

10. The regulator circuit of claim 1, wherein each of the first winding of the multiple coupled-inductor circuits are connected to a segment of the multi-segment secondary transformer winding in a full bridge rectifier topology.

11. The regulator circuit of claim 1, wherein the first windings of the multiple coupled-inductor circuits are connected to a segment of the multi-segment secondary transformer winding in a full-wave rectifier topology.

12. The regulator circuit of claim 1, wherein the second windings of the multiple coupled-inductor circuits are not connected in series to a dedicated current ripple limiting inductor.

13. A method of operating a multi-phase regulator circuit, the method comprising:
   applying the input voltage to multiple primary windings of multiple transformers of multiple switching converter circuits; wherein the multiple switching converter circuits each include a respective secondary circuit side that includes the transformer secondary winding and multiple coupled-inductor circuits, and wherein at least a portion of the multiple secondary circuit sides are connected in parallel; and
   extracting energy from multiple segments of respective secondary windings of the multiple transformers and charging multiple coupled-inductor circuits of the respective secondary circuit sides using the extracted energy, wherein each coupled-inductor circuit of the respective secondary circuit sides includes a first winding of the coupled-inductor circuit magnetically coupled to a second winding of the coupled-inductor circuit, and the second windings of the coupled-inductor circuits of the respective secondary circuit sides are connected together;
   wherein the applying the output current to the output node includes applying output current from the at least the portion of the multiple secondary circuit sides that are connected in parallel to the output node.

14. The method of claim 13, wherein the second windings of the coupled-inductor circuits of the multiple secondary circuit sides are connected together in series.

15. The method of claim 13, wherein a second winding of a first coupled-inductor circuit of a first secondary circuit side is connected in parallel to a second winding of another coupled inductor circuit of another secondary circuit side.

16. A multi-phase regulator circuit comprising:
multiple switching converter circuits each coupled to an input and a common output node of the multi-phase regulator circuit,
each respective switching converter circuit including:
  a step-down transformer including a primary winding and multiple secondary windings;
  a primary side circuit stage coupled to the input and the primary winding of the step-down transformer of the respective switching converter circuit and including at least one primary side switch; and
  a secondary side circuit stage coupled to the multiple secondary windings of the step-down transformer of the respective switching converter circuit, and including at least one secondary side switch and one or more coupled-inductor circuits coupled to the common output node; and
a controller circuit coupled to the multiple switching converter circuits and configured to:
  generate multiple activation signals to activate the primary side switch of a switching converter circuit out of phase with the at least one primary side switch of another switching converter circuit; and
  generate multiple activation signals to the secondary side switch circuits to provide electrical energy to the one or more coupled-inductor circuits of the switching converter circuits; and
wherein the one or more coupled-inductor circuits of the multiple switching converter circuits are connected in series to a circuit ground.

17. The multi-phase regulator circuit of claim 16, wherein the coupled-inductor circuits of one switching converter circuit are connected in parallel with the coupled-inductor circuits of another switching converter circuit.

18. The multi-phase regulator circuit of claim 16, wherein the one or more coupled-inductor circuits include first windings magnetically coupled to second windings, and the multi-phase regulator circuit does not include a compensation inductor connected to the second windings of the coupled-inductor circuits.

* * * * *